United States Patent
Burns et al.

[19]

[11] Patent Number: 5,958,036
[45] Date of Patent: Sep. 28, 1999

[54] CIRCUIT FOR ARBITRATING INTERRUPTS WITH PROGRAMMABLE PRIORITY LEVELS

[75] Inventors: Geoffrey Francis Burns, Macungie; Ravi Kumar Kolagotla, Lansdale, both of Pa.; Douglas J. Rhodes, Long Valley, N.J.; Marck E. Thierbach, Macungie, Pa.

[73] Assignee: Lucent Technologies Inc., Murray Hill, N.J.

[21] Appl. No.: 08/925,342

[22] Filed: Sep. 8, 1997

[51] Int. Cl.⁶ ........................................ G06F 9/46
[52] U.S. Cl. ................................ 710/262; 710/260
[58] Field of Search .......................... 395/733, 735, 395/736, 739, 729, 293; 710/260, 262, 266, 263, 264, 261, 240, 241, 113

[56] References Cited

U.S. PATENT DOCUMENTS

| | | | |
|---|---|---|---|
| 3,836,889 | 9/1974 | Kotok et al. | 395/737 |
| 4,035,780 | 7/1977 | Kristick et al. | 395/732 |
| 4,349,783 | 9/1982 | Robson et al. | 324/457 |
| 4,573,118 | 2/1986 | Damouny et al. | 712/234 |
| 5,083,261 | 1/1992 | Wilkie | 395/738 |
| 5,257,357 | 10/1993 | Yishay et al. | 395/742 |
| 5,257,383 | 10/1993 | Lamb | 395/733 |
| 5,530,903 | 6/1996 | Calvignac et al. | 395/861 |
| 5,659,759 | 8/1997 | Yamada | 395/738 |
| 5,748,969 | 5/1998 | Lee et al. | 395/732 |
| 5,758,169 | 5/1998 | Nizar et al. | 395/739 |
| 5,778,200 | 7/1998 | Gulick | 395/293 |
| 5,822,595 | 10/1998 | Hu | 395/737 |

*Primary Examiner*—Gopal C. Ray
*Attorney, Agent, or Firm*—Darby & Darby

[57] ABSTRACT

Apparatus for arbitrating the selection of an interrupt for servicing from a plurality of interrupts in which a priority level for each of the plurality of interrupts is programmed in a first register and each of the interrupts which is to be evaluated for selection for servicing is set as pending in a second register. Only a pending interrupt having a priority level above a pre-set current interrupt priority level is selected for servicing and where multiple pending interrupts of the same priority level occur, the one with the highest order bit position in the second register is used.

14 Claims, 3 Drawing Sheets

TABLE 1. INC0 REGISTER ENCODING

| BIT: | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| FIELD: | IPL9 | | IPL8 | | IPL7 | | IPL6 | | IPL5 | | IPL4 | | IPL3 | | IPL2 | | IPL1 | | IPL0 | |

TABLE 2. INC1 REGISTER ENCODING

| BIT: | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| FIELD: | IPL19 | | IPL18 | | IPL17 | | IPL16 | | IPL15 | | IPL14 | | IPL13 | | IPL12 | | IPL11 | | IPL10 | |

TABLE 3. INCS REGISTER ENCODING

| BIT: | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| FIELD: | 19 | 18 | 17 | 16 | 15 | 14 | 13 | 12 | 11 | 10 | 9 | 8 | 7 | 6 | 5 | 4 | 3 | 2 | 1 | 0 |

5,958,036

CIRCUIT FOR ARBITRATING INTERRUPTS WITH PROGRAMMABLE PRIORITY LEVELS

TECHNICAL FIELD OF INVENTION

This invention relates to a method and apparatus for interrupt priority arbitration in computer type devices such as microprocessors and digital signal processors.

BACKGROUND OF THE INVENTION

Conventional architecture for computer systems using devices such as microprocessors and digital signal processors (DSP) utilize instruction code supplied to these devices containing interrupt requests. Such an interrupt request instructs the central processing unit of the device to perform a routine or subroutine to service an external hardware device, such as a printer, modem, input device, etc. In many computer systems, a large number of such hardware devices are to be serviced. In such cases, the interrupt request for each of the devices may be assigned a different priority level to assure that the interrupt request of certain of the devices have priority over others and will be serviced first. Conflicts are possible relative to the action to be taken to service a plurality of the interrupt requests that occur or are pending at the same time. Therefore, there is a need to arbitrate the possible conflicts to assure proper operation of the central processing unit relative to servicing of the interrupt requests in a predetermined priority order.

The present invention is directed to a circuit operable in conjunction with a computer or DSP that supports multiple hardware interrupt requests having multiple levels of user-assigned priorities. There are two reasons for assigning priorities to the interrupts. The first is to permit nesting of interrupts, i.e., an interrupt service routine being performed can be interrupted by an interrupt of higher priority. The second is the servicing of concurrently pending interrupts according to their priority.

In the present invention, when an interrupt request occurs for one of a plurality of devices, a corresponding assigned bit is set in a register (INS) and the interrupt is then considered to be pending. Corresponding to each bit set in the INS register is an entry in a register (INC0 or INC1) corresponding to an interrupt priority level as assigned by the user by writing values into this register. In the preferred embodiment, the priority levels range from level 0 (fully disabled) to level 3 (highest level). A current interrupt priority level (CIPL), set from another part of the computer or DSP, establishes the priority level, or levels, of the pending interrupts which are to be selected for servicing. The pending interrupt is considered for selection for servicing if its programmable priority level is higher than the CIPL.

If multiple interrupts of the same priority level are pending, then only one interrupt may be serviced. The circuit of the invention arbitrates between competing interrupts as follows: 1) the interrupt with the highest priority level is the next to be serviced; 2) if multiple interrupts are pending with the same maximum priority level, then the pending interrupt with the lowest bit position in the INS register is the next to be serviced.

The interrupt specification requires the circuit to first evaluate each interrupt against its programmed priority level, and then to arbitrate competing interrupts by accounting for priority level and bit position in the INS register. The circuit completes the arbitration process within one clock cycle of the computer. In addition, the circuit encodes the interrupt into an offset field of fixed bit size for use in a following computing phase.

It is an object of the invention to provide a circuit to select an interrupt request for servicing from a plurality of requests based upon assigned priority levels for the various requests.

An additional object is to provide a circuit to first evaluate each of a plurality of pending interrupt requests of different priority levels against a programmed priority level, and that arbitrates between competing multiple pending interrupts having the same priority level by accounting for bit positions in a register of the competing interrupts.

Another object is to provide a circuit that arbitrates between competing pending interrupt requests with assigned priority levels in which the interrupt with the highest priority level is the next selected to be serviced and if multiple interrupts are pending with the same priority level, then the pending interrupt of that priority level as set in the lowest bit position of a register is the next to be serviced.

BRIEF DESCRIPTION OF THE DRAWINGS

Other objects and advantages of the present invention will be come more apparent upon reference to the following specification and annexed drawings in which.

DETAILED DESCRIPTION OF THE INVENTION

The invention is illustratively described relative to operation with a microprocessor in which there are registers having a word length of 20 bits, there are 20 hardware interrupts (19–0) to be serviced and there are four levels (0–3) of assigned priority for the interrupt request. Different word lengths, number of interrupts and assigned interrupt priority request levels may be utilized. The invention is also applicable to DSPs, RISC type processors and other similar devices.

Figure 1:
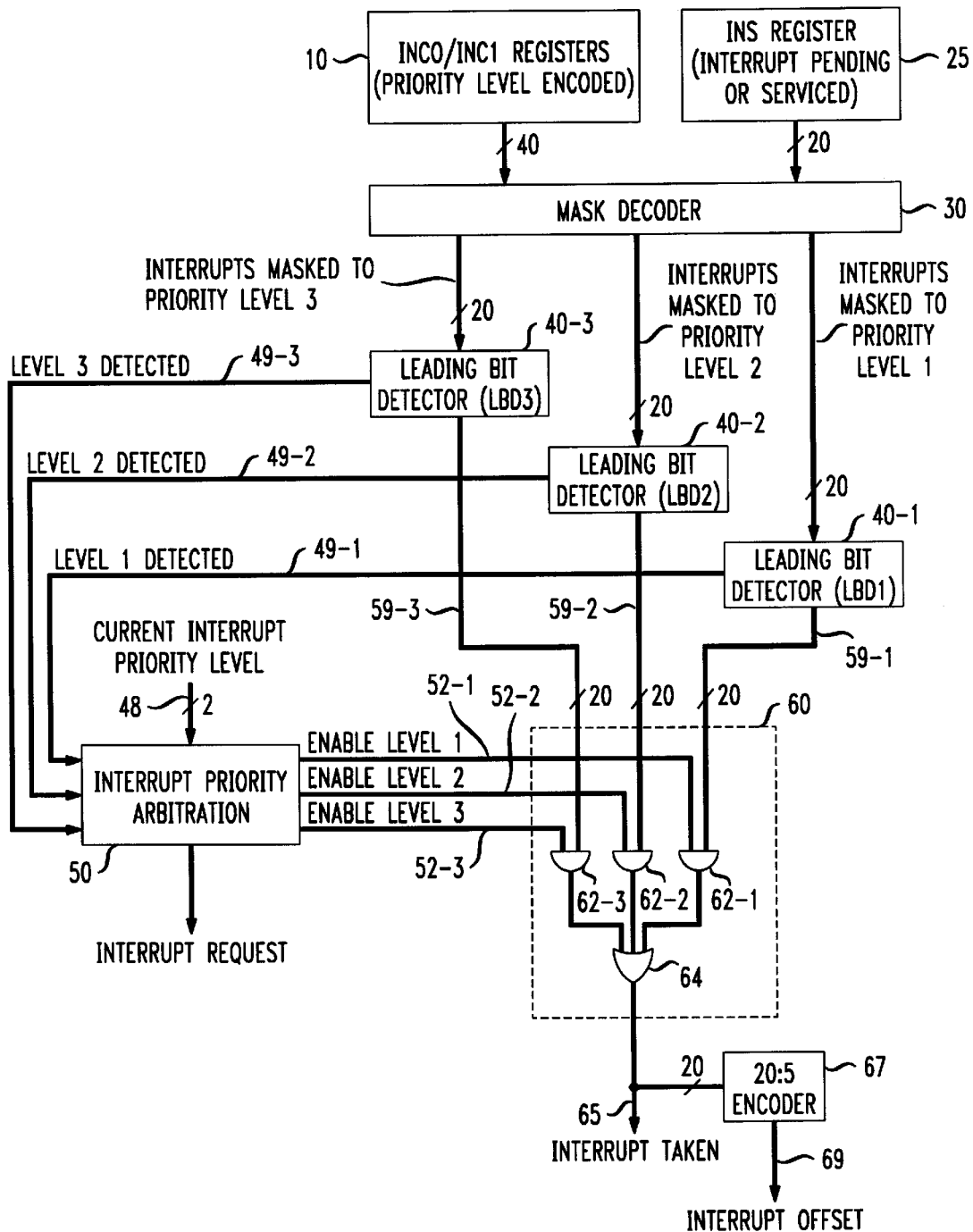
FIG. 1 is a schematic block diagram of the circuit of the invention.
Figures 2A, 2B, 2C, 3:
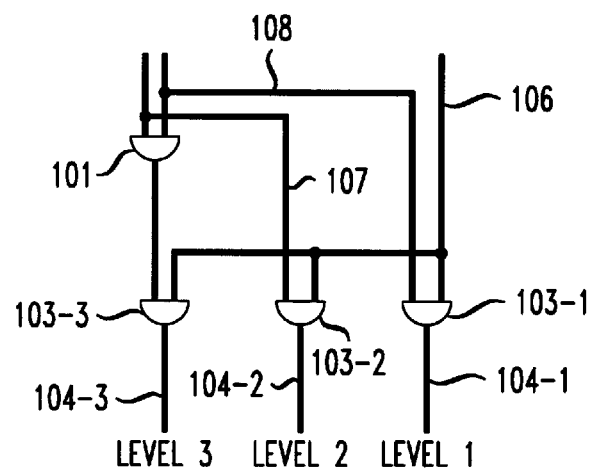
FIGS. 2A and 2B show Tables 1 and 2 of interrupt priority level assignments in registers INC0 and INC1.
FIG. 2C shows Table 3 illustrating the INS register fields.
FIG. 3 is a schematic diagram of a decoder circuit used for the masking decoder.

Referring to FIG. 1, an INC0/INC1 register 10 is encoded with data that assigns a priority level to various interrupt requests for different hardware devices. The registers INC0 and INC1 each have a word length of 20 bits each divided into 10 two bit fields, or segments, to correspond to the 20 interrupts in the circuit of the invention as being illustratively described. That is, there is a two bit field for each of the 20 interrupts. FIG. 2A shows Table 1 for register INC0 and FIG. 2B shows Table 2 for register INC1. As seen, the 20 bit length of register INC0 is divided into the ten fields IPL9 . . . IPL0 (interrupts 9–0) while register INC1 is divided into the ten fields IPL19 . . . IPL10 (interrupts 19–10), making a total of twenty fields, each field to correspond to the interrupt request of one of 20 hardware devices. In the description of the present invention, the convention is adopted that proceeding from the highest order bit position to the lowest order means going from bit (or field) 19 to bit (or field) 0. The reverse convention also can be utilized in which 0 indicates the highest order bit position and 19 the lowest.

Each of the 20 two bit fields IPL19–IPL0 of the INC0 and INC1 registers assigns a priority level to a corresponding numbered interrupt in the following manner

TABLE 4

| IPL Field Value | Description |
|---|---|
| 00 | Disable the interrupt |
| 01 | Enable the interrupt at priority 1 (lowest) |
| 10 | Enable the interrupt at priority 2 |
| 11 | Enable the interrupt at priority 3 (highest) |

An interrupt service register (INS) 25 has twenty fields of one bit length, as shown by Table 3 in FIG. 2C. Each of the INS register 25 fields corresponds to one of the twenty hardware interrupts (19–0) and, as described below, is to be associated with the corresponding priority level assignment field IPL19–IPL0 of the INC0/INC1 register. The status of the INS register field is set by an external device (not shown) driven by the application program. Setting an INS field to a pending state (logic 1) means that an interrupt request is to be evaluated for selection for servicing. The INS register 25 is also monitored by another device (not shown) to set its state to a logic 0 when there is no interrupt request pending on the interrupt or the servicing of the interrupt has been completed. That is:

TABLE 5

| INS Field | Value | Description |
|---|---|---|
| 19–0 | 0 | no request pending on interrupt |
|  | 1 | interrupt request is pending |

An instruction, from an external device or program, that writes a 1 to the corresponding number interrupt field in the INS register when the interrupt routine or sub-routine has been executed (serviced) clears the INS interrupt field and returns its state to not pending (logic 0). Writing a logic 0 to any INS register field leaves the bit of the field unchanged.

A mask decoder 30 is used to mask, or decode, the priority of each pending interrupt (set to logic 1 in INS 25). It masks the pre-assigned priority level of INC0/INC1 to the pending interrupt. That is, the two bit field of the INC0 and INC1 registers indicating the assigned priority (see Tables 1 and 2) is associated with each enabled bit position, indicating a pending interrupt, present in the INS register 25.

The mask decoder 30 receives a 40 bit input, two bits for each of the twenty fields of the INC0/INC1 registers, and a 20 bit input from the INS register 25, one bit for each of the twenty INS register fields. The mask decoder 30 sorts, or masks, each pending interrupt with its assigned priority level from 1 to 3 (see Table 4). Each masked pending interrupt is applied to a respective first, second and third level leading bit detector LBD1 40-1, LBD2 40-2 or LBD3 40-3, whose function is described below, according to its pre-assigned priority level as assigned in INC0/INC1 registers.

FIG. 3 shows one of the decoder circuits 100 of the mask decoder 30, which has twenty identical decoder circuits 100. That is, there is one decoder circuit 100 for each of the twenty interrupts 19–0. The output of the INS register 25 field is applied over line 106 to one input of each of three AND gates 103-1, 103-2 and 103-3. Both bits of the two bit signal of a field from the registers INC0/INC1 are applied over lines 107 and 108 to the two inputs of an AND gate 101. A first bit on line 107 of the two bit INC0/INC1 field is also applied to other input of the AND 103-2 and the second INC0/INC1 bit on line 108 is applied to the other input of AND 103-1. The first input of AND 103-3 receives the output of the AND 101 while the other input receives the INS register bit on line 106. The output of each of the AND gates 103 appears on a respective output line 104-1, 104-2 and 104-3.

Based upon the applied value of the two bit field of the INC0/INC1 register (see Table 4), and the presence of a logic 1 on line 106, indicating a pending interrupt in INS register 25, the lines 104 will have respective outputs corresponding to the assigned priority level for the INC0/INC1 field. That is, AND gate 103-3 output line 104-3 will have a high (logic 1) output for a pending interrupt (19–0) with an assigned priority level of 3, output line 104-2 a high output for a pending interrupt with an assigned priority level of 2, and output line 104-1 a high output for a pending interrupt with an assigned priority level of 1. In essence, each decoder circuit 100 converts the two bit field of the INC0/INC1 register, designating the priority levels 1–3 of the respective interrupt 19–0, into a one bit signal (1 or 0) on the corresponding output line 104 of the decoder circuit for the pending interrupt corresponding to its respective pre-assigned priority level. Thus, the decoder 30 associates the pending interrupts (each with a logic 1 in INS register 25) with their respective pre-assigned priority levels of 1–3 and indicates this on the output lines 104-3, 104-2 and 104-1 of the decoder circuit 100 for each interrupt.

The circuit next sorts the pending interrupts of each of the priority levels in a manner to enable selection of the one to be serviced when there are two or more pending interrupt of the same priority level. This is done by a leading bit detector (LBD) circuit 40 for each of the priority levels. In the illustrative embodiment of the present invention, the protocol is adopted that each priority level LBD 40 passes for further processing only the logic 1 found in the highest bit position (19–0) of multiple pending interrupts in the incoming masked 20 bit field from decoder 30. That is, each LBD effectively pre-arbitrates between pending multiple interrupts of the same priority level.

The level 3 output line 104-3 of each of the twenty mask decoder circuits 100 is applied in interrupt sequence 19–0 to a priority level 3 leading bit detector (LBD) 40-3, the level 2 output lines 104-2 to a priority level 2 LBD 40-2, and the level 1 output lines 104-1 1 to a priority level 1 LBD 40-1. Each LBD 40 receives twenty signals (1 or 0) of one bit length, with each logic 1 bit corresponding to a pending one of the twenty interrupts of the priority level of the LBD. Each LBD 40 respectively examines its twenty input signals in the order of the twenty interrupts 19–0 and passes the highest level bit detected to a decision select circuit 60, described below, as a detected output. The detected leading logic 1 bit indicates the leading one (highest order interrupt) if there are multiple pending interrupts of the same priority level.

Upon an LBD 40-1, 40-2 or 40-3 detecting the presence of a pending interrupt of its respective priority level, it also outputs a logic 1 bit, indicating that an interrupt of its priority level is pending, on a respective line 49-1, 49-2 and 49-3 to a priority arbitrator circuit 50. The arbitrator 50 also receives the CIPL designation on line 48. The operation of arbitrator 50 is described below.

Figure 5:
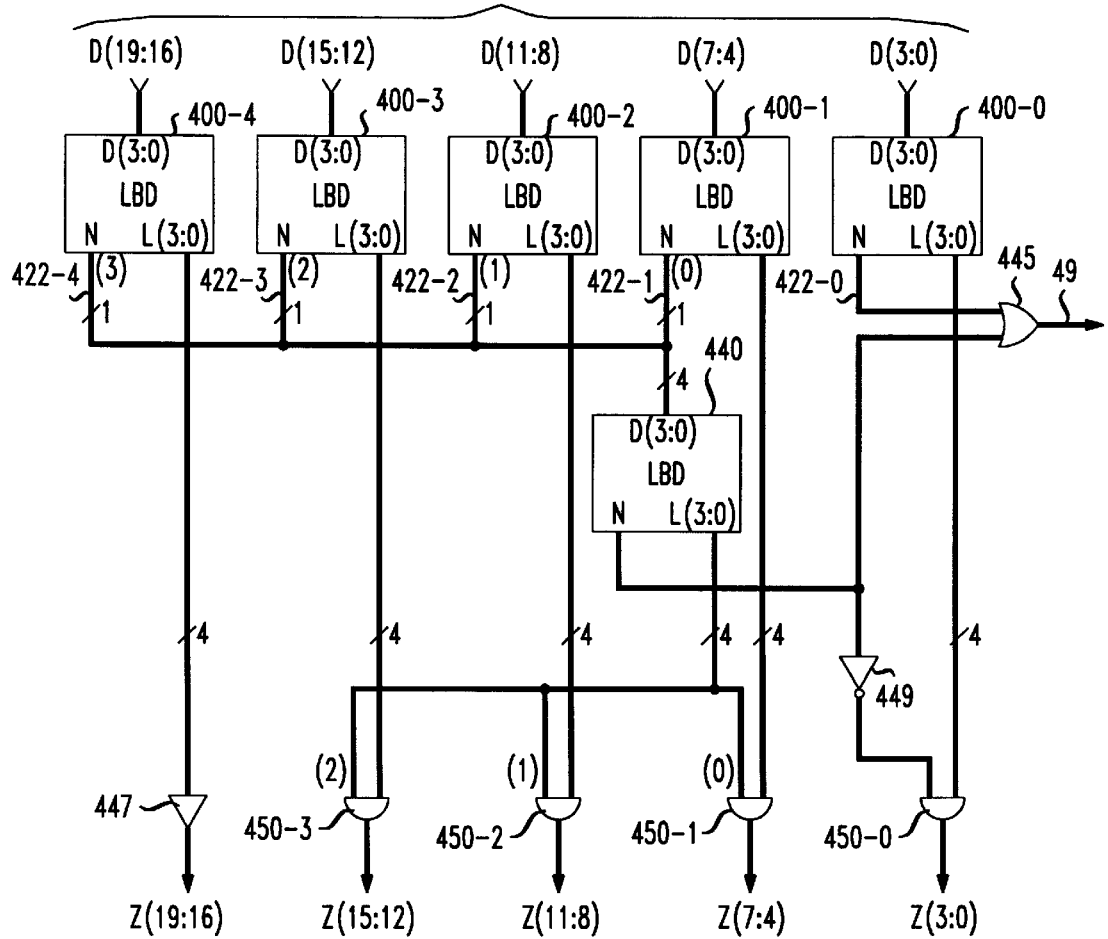
FIG. 5 is a schematic diagram of a leading bit detector circuit.

FIG. 5 shows a circuit for the LBD 40. Each of the three LBDs 40-1, 40-2 and 40-3 has the same circuit but, as shown in FIG. 1, receives inputs from the masking decoder 30 only corresponding to its respective priority level.

Figure 4:
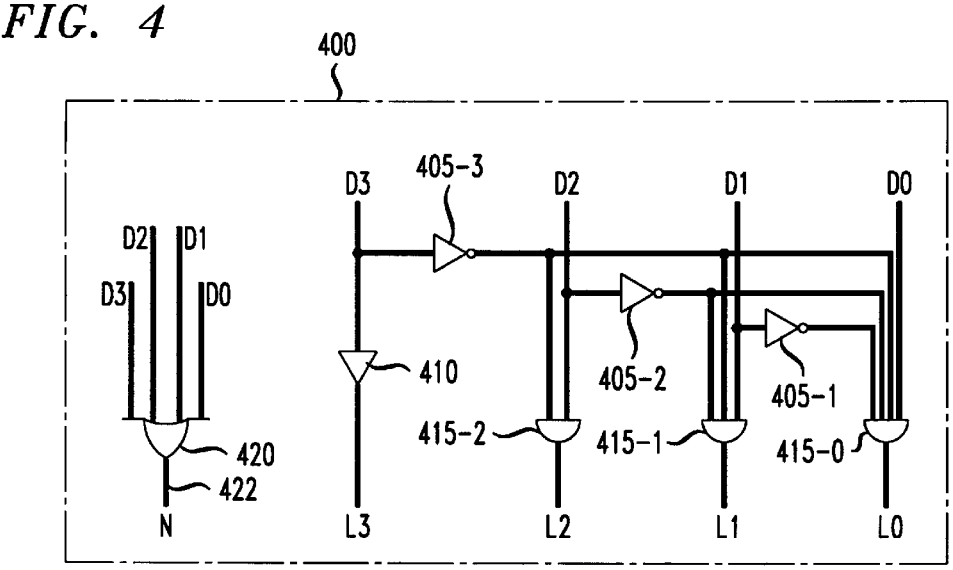
FIG. 4 is a schematic block diagram of an element of a leading bit detector circuit.

One element 400 of an LBD circuit 40 is shown in FIG. 4. Here, element 400, as shown, processes four bits of the twenty bit field received by the LBD from the decoder 30, so there would be a total of five of the elements 400 for the LBD to process the twenty bits from the masking decoder. In FIG. 4, the four bits of the twenty from the decoder 30 that are being processed by an element 400 are generically designated data bits D3 (highest order), D2, D1 and D0. The D inputs are logic 1, interrupt pending, or logic 0, interrupt not pending. The four D inputs correspond to four of the 20 interrupts. For example, if the element 400 of FIG. 4 is processing the highest order interrupts of its priority level, then these would correspond to interrupts 19, 18, 17 and 16. The four inputs D3 . . . D0 of the next lower order element 400 would process interrupts 15, 14, 13 and 12, and so forth.

LBD element 400 has a single input buffer (gate) 410 that receives D3 and D3 is also applied through an inverter 405-3 to one input of a two input AND 415-2, one input of a three input AND 415-1 and one input of a four input AND 415-0. AND 415-2 receives bit D2 as its other input and D2 is also applied through an inverter 405-2 to each of the second input of AND 415-1 and the second input of AND 415-0. Bit D1 is applied as the third input to AND 415-1 and is also applied through an inverter 405-1 as the third input to AND 415-0. The fourth input to AND 415-0 is bit D0. Buffer 410 and the ANDs 415-2, 415-1 and 415-0 have the respective outputs L3, L2, L1 and L0. An OR gate 420 receives each of the four input bits D3, D2, D1 and D0 and has an output N on line 422.

For the LBD element 400, the following truth table applies

| D | | | | L | | | | N |
|---|---|---|---|---|---|---|---|---|
| 0 | 0 | 0 | 0 | 0 | 0 | 0 | 0 | 0 |
| 1 | — | — | — | 1 | 0 | 0 | 0 | 1 |
| 0 | 1 | — | — | 0 | 1 | 0 | 0 | 1 |
| 0 | 0 | 1 | — | 0 | 0 | 1 | 0 | 1 |
| 0 | 0 | 0 | 1 | 0 | 0 | 0 | 1 | 1 | e column D from left to right corresponds to the inputs D3, D2, D1 and D0 and column L from left to right corresponds to the outputs L3, L2, L1 and L0 for the gates 410, 415-2, 415-1 and 415-0. The OR 420 has an output N if there is a logic 1 on any one of the inputs D3, D2, D1 or D0.

Assuming that there is a logic 1 for D3 (interrupt pending), this is applied to buffer 410 and there will be an output L3. The logic 1 for D3 will be inverted in inverter 405-3 and a logic 0 placed on one input of each of the AND gates 415-2, 415-1 and 415-0 to disable these ANDs and prevent the passage of any D input to its respective L output. Similarly, a logic 1 at D2 disables passage of lower order bits through the ANDs 415-1 and 415-0 and a logic 1 at D1 disables passage of a bit through AND 415-0. There can be only one L output from an element 400 irrespective of the number of D inputs and only the highest order bit received by the element 400 will have an output on its corresponding L line. If all D inputs to an element 400 are logic 0, then the element 400 will not have an L output.

The OR 422 will have a logic 1 output on its N output line 422 when a logic 1 is present on any one of D3, D2, D1 and D0. If there is no logic 1 to any D input of the LBD element 400, then OR 420 will have a logic 0 as its N output.

FIG. 5 is a diagram of a complete LBD circuit in which five of the elements 400 of FIG. 4 are used and designated 400-4 . . . 400-0 from the highest to lowest order in receiving the pending status data from the interrupts (19–0) of the priority level of the respective LBD. The twenty interrupt (D) status (1 or 0) signals are applied in groups of four to the four inputs of each of the five LBD elements 400 in descending order as shown. Considering the highest order element 400-4, this receives as its input data D3 . . . D0, corresponding to the status of interrupts 19 . . . 16. Each successively lower order element 400 receives as its data inputs D3 . . . D0 the status of the four successively lower order numbered interrupts.

Each of the four outputs L3 . . . L0 of the highest order LBD element 400-4 is connected to a respective one of four buffers 447, each corresponding to an interrupt. As explained with respect to FIG. 4, there will be an L output only on the highest order line of element 400-4 if there are multiple D inputs to the element. This will produce an output on the buffer 447 receiving the L output. Thus, only the highest order bit corresponding to a pending interrupt 19–16 will be able to be passed for a final arbitration decision.

The signal on N output line 422 of the OR 420 of each of the elements 400-4 . . . 400-1 is applied as one D input in the order D3 . . . D0 to a selector element 440 which is of the same construction as element 400. In selector element 440, the L3 . . . L0 outputs correspond to the presence or absence of an N output from the corresponding LBD element 400-4 (L3) . . . 400-1 (L0 ). As with element 400, only the highest order L line (highest order element 400-4 . . . 400-1) of selector element 440 having a logic 1 D input (N output of an LBD element 400) will have a logic 1 output.

There are four sets of AND gates 450-3 . . . 450-0, each set 450 comprised of four AND type gates. Referring to the highest order AND 450-3, one input of each of its four gates receives one of the L3 . . . L0 outputs from LBD element 400-3. Thus, the first gate of AND 450-3 receiving the L3 output of LBD element 400-3 corresponds to interrupt 15, the second of the four gates receives L2 and corresponds to interrupt 14, and so on. The other input of each of the four gates of AND 450-3 is the L2 output of the selector element 440. Similarly, the first of the four gates of AND 450-2 receives the L3 output of element 400-2 corresponding to interrupt 11, the second one of the four AND 450-2 gates receives the L2 output corresponding to interrupt 10, and so on. The other input of each of the four gates of AND 450-2 receives the L1 output of the selector element 440.

In like manner, the first of the four gates of AND 450-1 receives the L3 output of element 400-1 corresponding to interrupt 7, the second one of the four AND 450-1 gates receives the L2 output corresponding to interrupt 6, and so on. The other input of each of the four gates of AND 450-1 receives the L0 output of the selector element 440.

The selector element 440 has an L output only on the highest order line L2, L1 or L0 corresponding to the highest order one of the LBD elements 400-3, 400-2 and 400-1 that had an N output, meaning that the element 400 had detected a pending interrupt as an input. Selector element 440 has only either an L2, L1 or L0 output, meaning that only the highest level element 400-3 . . . 400-1 will be effective as one input to enable the four gates of the corresponding AND 450-3, 450-2 or 450-1. Only the enabled L3, L2, L1 or L0 output of the highest order LBD element 400-3, 400-2 and 400-1 that had an N output will pass through the corresponding one of the four gates of the AND 450. The N output of element 400-4 is used for another purpose, as described below.

The four gates of the lowest order AND 450-0 respectively receive as one input the corresponding L3 . . . L0 output (interrupts 3 . . . 0) of the lowest order LBD element 400-0. The other input to each of the four gates of AND 450-0 is the N output of the selector element 440 through an inverter 449. There will be an N output only if one of the LBD elements 400-1 . . . 400-0 has a D input. Thus, one of the four gates of AND 450-0 can be enabled only when all four of the higher order elements 400-4 . . . 400-1 all have no N output meaning that none of them had a D input.

Accordingly, as a result of the circuit of FIG. 5, only the highest order one of the buffers 447 or gates of the four gate AND sets 450 will have an output. This means that only the highest order pending interrupt of multiple pending interrupts of the priority level of the LBD 40 will be passed by the LBD.

The N output of selector element 440 and the N output of element 400-0 are applied as inputs to an OR 445. The OR 445 will receive an N input and produce an output on line 49 so long as any one of the LBD elements 400 has received a D input, meaning that there is at least one pending interrupt of the priority level of the LBD. This provides the signal on the corresponding output line 49 of each LBD to the arbitrator 50 to indicate the presence of a pending interrupt on that priority level LBD.

The twenty L output lines from the buffers 447 and AND gates 450 of each LBD 40 are connected to a 20-bit wide three-way and/or select decision device, or multiplexer, 60. The output of the select device 60 is the interrupt taken for servicing. That is, the output of each of the three LBDs 40 will tell an interrupt decision select circuit 60 the identity of the first (highest level) of the pending interrupts of the priority level of the LBD and if this pending interrupt is at a level greater than the CIPL set in the arbitrator 50, then that signal (interrupt) is the final one selected for servicing.

The priority arbitrator circuit 50 receives an input on the respective lines 49-1, 49-2 and 49-3 from each of the LBDs 40-1, 40-2 and 40-3 having a pending interrupt. The arbitrator 50 is pre-set with a current interrupt priority level (CIPL) instruction on line 48 by the application program to establish the priority level of the interrupt that is to be passed to be serviced. That is, it might be decided by a program instruction provided to arbitrator 50 to honor and service only interrupts whose priority level is greater than 2. This illustrative example is shown in FIG. 1.

The arbitrator 50 essentially is a unit that has three AND gates, each gate corresponding to a priority level. The AND gate, or gates, which are to effect passage of interrupts above a priority level as set on CIPL line 48 are enabled. To do this, the CIPL operates logic to enable one input of the AND gate, or gates, of the priority level, or levels, of the interrupts to be passed. The other input to each AND gate is the signal appearing on corresponding priority level line 49-1, 49-2, 49-3 from the LBDs indicating whether or not there is a pending interrupt of the priority level, or levels, that has been detected by the LBD.

The arbitrator 50 logic has three enable output lines 52-1, 52-2 and 52-3, corresponding to priority level 1, priority level 2 and priority level 3, that are connected to the decision select circuit 60. The enable output line, or lines, 52 of arbitrator 50 corresponding to a priority level, or levels, greater than the pre-set CIPL level on line 48 will be high (logic 1). In setting the CIPL in accordance with the protocol of the preferred embodiment of the invention, 0 indicates that all pending interrupts with priority levels >0 will pass, 1 indicates that all pending interrupts with levels >1 will pass, 2 indicates that all pending interrupts with levels >2 will pass, and 3 indicates that all levels are disabled (since a pending interrupt with a priority level of 3 would have passed with the CIPL=2). In the example shown in FIG. 1, only priority levels greater than level 2 are to be serviced. Therefore, as set by the CIPL, only enable level line 52-3 is high.

A set of twenty decision circuits forms decision select circuit 60, one of which is shown in FIG. 1. Each decision circuit is dedicated to an interrupt (19–0) and receives the status (pending or not) of that interrupt from each LBD 40-1, 40-2, and 40-3 (priority level of the interrupt). Each decision circuit, corresponding to the same number interrupt of each of LBD 40-1, 40-2 and 40-3, has three AND gates 62-1, 62-2 and 62-3. That is, each of the twenty decision circuits corresponds to one of the hardware interrupts 19–0. The output lines for an interrupt of LBD 40-1, 40-2 and 40-3 is connected as one input to the corresponding AND gate 62-1, 62-2 and 63-3 of its respective decision circuit 60. The other input to each decision AND gate 62-1, 62-2 and 62-3 is from the arbitration circuit 50 corresponding enable line 52-1, 52-2 and 52-3. The output of each of the three AND gates 62 is applied to an OR 64 which has an output 65.

In the example described, where the CIPL on line 48 sets the arbitrator 50 to pass only priority level 3 pending interrupts, only arbitrator output line 52-3 is high. This signal is sent to the AND gate 62-3 of all of the decision circuits and the decision circuit AND gate 62-3 that receives the leading bit pending interrupt of priority level 3 will have an output to OR 64. This places an interrupt output on line 65, which is the interrupt taken to be serviced. Thus, only the leading bit pending interrupt signal from LBD 40-3 will pass through the corresponding decision circuit 60 and will be serviced. For example, if two pending interrupts 12 and 16 are determined by the mask decoder 30 to have the same priority level of 3, then only the interrupt 12 will be taken and serviced.

In the example being described, a pending interrupt of level 2 and lower will not pass through its corresponding decision circuit 60 since there will be no enabling signals on arbitrator output lines 52-2 and below and the AND gates 62-1 and 62-2 of the decision circuits will not be enabled to pass signals to gate 64.

The arbitration protocol of the illustrated embodiment is preferably set so that if pending interrupts of multiple levels above the CIPL value are detected, then the highest level signal is enabled. To do this, the logic in the arbitrator 50 would evaluate from the signals on the LBD output lines 49 the priority levels of the pending interrupts and would place a signal on the enable line 52 of the highest priority level above the CIPL. The arbitrator 50 also can be configured to pass interrupts equal to or above the CIPL.

The interrupt to be serviced on line 60 is also conveyed to a 20:5 encoder 67 which converts the interrupt identity information into a code, e.g. hexadecimal, which is a more compact and useful representation to be used for further processing. The converted code appears on line 69.

The invention can be expanded to support additional interrupt priority levels by adding one LBD per level, and expanding the interrupt priority arbitration logic 50 and 60. In certain types of computer architecture, it is also possible to take advantage of the early arrival of the CIPL entries, by combining the CIPL information with the INC0/INC1 in the mask decoder 30, thereby simplifying and speeding the interrupt priority arbitration circuit. Combining CIPL with the mask effectively shuts off fields corresponding to priorities below CIPL, removing the need for such logic in the arbitrator 50.

We claim:

1. Apparatus operating with a plurality of interrupts in which a pending interrupt is to be selected for servicing on a priority level basis, comprising:

a first register having a plurality of interrupts each being programmed at one of a plurality of priority levels;

a second register in which a state is set for certain of said plurality of interrupts to be in a pending state so as to be evaluated for selection for servicing; and an arbitration circuit responsive to the data in said first and second registers programmed to select and pass for servicing one interrupt of a pending state having a predetermined one or more of said plurality of priority levels.

2. Apparatus as in claim 1, wherein said arbitration circuit selects for servicing only one interrupt of a pending state from a plurality of interrupts of the pending state having the same priority level.

3. Apparatus as in claim 1, wherein said arbitration circuit selects for servicing from said interrupts of a pending state in the order of decreasing priority level.

4. Apparatus as in claim 3, wherein said arbitration circuit selects for servicing only interrupts of a pending state at or above a predetermined priority level of said plurality of priority levels.

5. Apparatus as in claim 4, wherein said arbitration circuit selects for servicing only one interrupt from multiple interrupts of a pending state having the same priority level.

6. Apparatus as in claim 5, wherein the one pending interrupt of multiple interrupts of a pending state of the same priority level selected for servicing is the highest order pending interrupt.

7. Apparatus as in claim 1, wherein said arbitration circuit includes a masking decoder operative to associate an interrupt of a pending state in said second register with the priority level programmed for each said interrupt of the pending state in said first register.

8. Apparatus as in claim 7, wherein said masking decoder places interrupts of a pending state and of the same priority level in ordered sequence.

9. Apparatus as in claim 8, wherein said arbitration circuit selects the lowest order interrupt of a pending state in the ordered sequence of said at least one predetermined one of said plurality of priority levels.

10. Apparatus as in claim 9, wherein said arbitration circuit passes for selection only interrupts of a pending state of a priority level at or above a predetermined priority level.

11. Apparatus as in claim 10, wherein said arbitration circuit passes for selection from multiple interrupts of a pending state of the same priority level only the lowest order interrupt of the pending state in the ordered sequence.

12. Apparatus as in claim 7, further comprising a plurality of detectors each corresponding to a respective priority level for receiving the interrupts of a pending state of the corresponding priority level from said masking decoder.

13. Apparatus as in claim 12, wherein each said detector passes for selection for servicing from multiple interrupts of a pending state of the priority level of a said detector only the lowest order pending interrupt in the ordered sequence.

14. A method for arbitrating among a plurality of interrupts in which a pending interrupt is to be selected for servicing on a priority level basis, comprising:

programming in a single first register one of a plurality of priority levels for each of said plurality of interrupts;

setting in a second register a pending state for certain of said plurality of interrupts to be evaluated for selection for servicing; and selecting and passing for servicing only an interrupt of a pending state of at least one predetermined one of said plurality of priority levels based upon the data in said first and second registers.

* * * * *

UNITED STATES PATENT AND TRADEMARK OFFICE
CERTIFICATE OF CORRECTION

PATENT NO.   :   5,958,036
DATED        :   September 28, 1999
INVENTOR(S)  :   Georffrey Francis BURNS et al.

It is certified that errors appear in the above-identified patent and that said Letters Patent is hereby corrected as shown below:

Title page, [75] Inventor, change "MARCK E. THIERBACH, MACUNGIE, PA." to

--MARK E. THIERBACH, SOUTH WHITEHALL TURNPIKE, PA.--.

Signed and Sealed this

Fifth Day of September, 2000

Attest:

Q. TODD DICKINSON

*Attesting Officer*    *Director of Patents and Trademarks*